US 8,218,463 B2
Jul. 10, 2012

(12) United States Patent
Hall

(10) Patent No.: US 8,218,463 B2
(45) Date of Patent: *Jul. 10, 2012

(54) SYSTEM AND METHOD FOR MOBILE AD HOC NETWORK

(75) Inventor: Robert J Hall, Berkeley Heights, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 344 days.

This patent is subject to a terminal disclaimer.

(21) Appl. No.: 12/404,811

(22) Filed: Mar. 16, 2009

(65) Prior Publication Data
US 2009/0175223 A1    Jul. 9, 2009

Related U.S. Application Data

(63) Continuation of application No. 11/289,899, filed on Nov. 30, 2005, now Pat. No. 7,525,933.

(51) Int. Cl.
H04B 7/00    (2006.01)

(52) U.S. Cl. ....... 370/310; 370/315; 455/11.1; 455/41.2

(58) Field of Classification Search ............... 370/310, 370/315; 455/11.1, 41.2
See application file for complete search history.

(56) References Cited

U.S. PATENT DOCUMENTS

| | | | |
|---|---|---|---|
| 6,015,344 A | 1/2000 | Kelly et al. | |
| 6,304,556 B1 | 10/2001 | Haas | |
| 6,628,620 B1 | 9/2003 | Cain | |
| 6,781,971 B1 | 8/2004 | Davis et al. | |
| 6,807,165 B2 | 10/2004 | Belcea | |
| 6,816,460 B1 | 11/2004 | Ahmed et al. | |
| 6,870,846 B2 | 3/2005 | Cain | |
| 6,879,574 B2 | 4/2005 | Naghian et al. | |
| 6,909,706 B2 | 6/2005 | Wilmer et al. | |
| 6,937,602 B2 | 8/2005 | Whitehill et al. | |
| 6,940,832 B2 | 9/2005 | Saadawi et al. | |
| 6,954,435 B2 | 10/2005 | Billhartz et al. | |
| 6,958,986 B2 | 10/2005 | Cain | |
| 7,027,822 B1 | 4/2006 | Hwang et al. | |
| 7,152,110 B2 | 12/2006 | Pierce | |
| 7,179,166 B1 | 2/2007 | Abbott | |
| 7,197,326 B2 | 3/2007 | Acampora | |
| 7,295,521 B2 | 11/2007 | Choi et al. | |
| 7,307,978 B2 | 12/2007 | Carlson | |
| 7,525,933 B1 | 4/2009 | Hall | |
| 7,613,467 B2 | 11/2009 | Fleischman | |
| 7,813,326 B1 | 10/2010 | Kelm et al. | |
| 7,917,169 B1 | 3/2011 | Hall | |
| 7,969,914 B1 | 6/2011 | Gerber | |

(Continued)

OTHER PUBLICATIONS

Hall et al., "A Two-Level Quality of Service Scheme for Collision based on Mobile Ad Hoc Networks", IEEE, 1-4244-1513-06/07, 2007, 8 pages.

(Continued)

Primary Examiner — Charles Appiah
Assistant Examiner — Jaime Holliday
(74) Attorney, Agent, or Firm — Woodcock Washburn LLP

(57) ABSTRACT

A method and system for geocasting data packets in a MANET. The MANET is combined with a long-range network such that a wireless terminal can decide whether to rebroadcast a geocast packet over the MANET, the long-range network, or not at all, depending on the wireless terminal's proximity to the geocast region, the location of the originating wireless terminal, or both. A wireless terminal close to or within the geocast region can rebroadcast on the MANET, whereas a wireless terminal far from the geocast region can rebroadcast on the long-range network.

10 Claims, 4 Drawing Sheets

U.S. PATENT DOCUMENTS

| | | |
|---|---|---|
| 8,085,813 B2 | 12/2011 | Melick et al. |
| 2002/0141454 A1 | 10/2002 | Muniere |
| 2002/0155846 A1 | 10/2002 | Shiraga |
| 2002/0163912 A1 | 11/2002 | Carlson |
| 2002/0167960 A1 | 11/2002 | Garcia-Luna-Aceves |
| 2003/0193394 A1 | 10/2003 | Lamb |
| 2003/0235158 A1 | 12/2003 | Lee |
| 2004/0213270 A1 | 10/2004 | Su et al. |
| 2005/0058151 A1 | 3/2005 | Yeh |
| 2005/0096065 A1 | 5/2005 | Fleischman |
| 2005/0152318 A1 | 7/2005 | Elbatt et al. |
| 2005/0152378 A1 | 7/2005 | Bango et al. |
| 2005/0254453 A1 | 11/2005 | Barneah |
| 2005/0259597 A1 | 11/2005 | Benedetto |
| 2006/0013154 A1 | 1/2006 | Choi et al. |
| 2006/0023677 A1 | 2/2006 | Labrador |
| 2006/0084444 A1 | 4/2006 | Kossi et al. |
| 2006/0126535 A1 | 6/2006 | Sherman |
| 2006/0128349 A1 | 6/2006 | Yoon |
| 2006/0148516 A1 | 7/2006 | Reddy et al. |
| 2006/0153157 A1 | 7/2006 | Roh et al. |
| 2007/0008925 A1 | 1/2007 | Dravida et al. |
| 2007/0019594 A1 | 1/2007 | Perumal et al. |
| 2007/0110092 A1 | 5/2007 | Kangude et al. |
| 2007/0217346 A1 | 9/2007 | Zheng |
| 2007/0259716 A1 | 11/2007 | Mattice et al. |
| 2007/0259717 A1 | 11/2007 | Mattice et al. |
| 2007/0265088 A1 | 11/2007 | Nakada et al. |
| 2007/0287437 A1 | 12/2007 | Cartmell |
| 2008/0080401 A1 | 4/2008 | Ribiere |
| 2008/0144493 A1 | 6/2008 | Yeh |
| 2008/0159236 A1 | 7/2008 | Ch'ng |
| 2008/0192737 A1 | 8/2008 | Miyazaki |
| 2009/0041039 A1 | 2/2009 | Bear |
| 2009/0046628 A1 | 2/2009 | Hall |
| 2009/0138353 A1 | 5/2009 | Mendelson |
| 2009/0175223 A1 | 7/2009 | Hall |
| 2009/0201860 A1 | 8/2009 | Sherman et al. |
| 2009/0248420 A1 | 10/2009 | Basir |
| 2010/0067451 A1 | 3/2010 | Hall |
| 2010/0082513 A1 | 4/2010 | Liu |
| 2010/0279776 A1 | 11/2010 | Hall |
| 2010/0304759 A1 | 12/2010 | Leppanen et al. |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |

OTHER PUBLICATIONS

Hall, "RTEQ: Modeling and Validating Infinite-State Hard-Real-Time Systems", AT&T Labs Research, ASE 2007, Nov. 2007, 4 pages.

Illyas, "Body Personal, and Local Ad Hoc Wireless Networks", Chapter 1, CRC Press, 2003, 22 pages.

Ko et al., "Geocasting in Mobile Ad Hoc Networks: Location-based Multicast Algorithms", Technical Report TR-98-018 Texas A&M University, Sep. 1998.

Liao et al., "GRID: A Fully Location-Aware Routing Protocol for Mobile Ad Hoc Networks", Telecommunication Systems, 2001, 18, pp. 1-26.

Shih et al., A Distributed Slots Reservation Protocol for QoS Routing on TDMA-based Mobile Ad Hoc Networks, 2004, (ICON 2004), Proceedings, 12$^{th}$ IEEE International Conference, Nov. 2004, 2, 660-664.

Shih et al., "CAPC: A Collision Avoidance Power Control MAC Protocol for Wireless Ad Hoc Networks", IEEE Communications Letters, Sep. 2005, 9(9), 859-861.

Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.

U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.
U.S. Appl. No. 13/169,829, filed Jun. 27, 2011, Hall.
U.S. Appl. No. 12/277,895, filed Oct. 20, 2011, Hall.

Ko, et al., "Flooding-Based Geocasting Protocols for Mobile Ad Hoc Networks," Mobile Networks and Applications, Dec. 2002, 7, 471-480.

Hall, "Cheating Attacks and Resistance Techniques in Geogame Design," Proc. 2010 ACM FuturePlay Symposium, 2010, 82-89.

Hall, "An Improved Geocast for Mobile Ad Hoc Networking," IEEE Transactions on Mobile Computing, 2010, 1-14.

Corbett, et al. "A Partitioned Power and Location Aware MAC Protocol for Mobile Ad Hoc Networks," Technical Report No. 553, University of Sydney, School of Information Technologies, Jul. 2004, 7 pages.

Panta, "GeoV2V: Vehicular Communications Using a Scalable Ad Hoc Geocast Protocol," AT&T Labs Research, 14 pages, Nov. 2011.

Balasubramaniam, et al. "Interactive WiFi Connectivity for Moving Vehicles," Proceedings of SIGCOMM, Aug. 17-22, 2008, 12 pages.

Maihofer, "A Survey of Geocast Routing Protocols," IEEE Communications Surveys, Jun. 2004, 32-42.

Das, et al., "SPAWN: A Swarming Protocol for Vehicular Ad-Hoc Wireless Networks," Proceedings of 1$^{st}$ ACM Vanet, Oct. 2004, 2 pages.

German Aerospace Center, Simulation of Urban Mobility, 2010, http://sumo.sourceforge.net, 1 page.

Gupta, et al., "The Capacity of Wireless Networks," IEEE Transactions on Information Theory, 46(2), Mar. 2000, 17 pages.

Hadaller, et al., "Vehicular Opportunistic Communication Under the Microscope," Proceedings of MobiSys, Jun. 11-14, 2007, 206-219.

Heissenbüttel, et al., "BLR: Beacon-Less Routing Algorithm for Mobile Ad-Hoc Networks," Elsevier's Computer Communications Journal, 27, 2003, 15 pages.

Hall, et al., "A Tiered Geocast Protocol for Long Range Mobile Ad Hoc Networking," Proceedings of the 2006 IEEE Military Communications Conf., 2006, 8 pages.

Hull, et al., "CarTel: A Distributed Mobile Sensor Computing System," Proceedings of ACM SenSys, Nov. 2006, 14 pages.

Eriksson, et al., "Cabernet: Vehicular Content Delivery Using WiFi," Proceedings of Mobicom, Sep. 2008, 12 pages.

Karp, et al, "GPSR: Greedy Perimeter Stateless Routing for Wireless Networks," Proceedings of Mobicom, 2000, ACM 2000, 12 pages.

Kuhn, et al., "Geometric Ad-Hoc Routing: Of Theory and Practice," Proc. 2003 Symposium on Principles of Distributed Computing, ACM 2003, 10 pages.

Lee, et al., "CarTorrent: A Bit-Torrent System for Vehicular Ad-Hoc Networks," Mobile Networking for Vehicular Environments, Sep. 2007, 6 pages.

Lee, et al., "Efficient Geographic Routing in Multihop Wireless Networks," Proc. MobiHoc 2005, ACM, 2005, 12 pages.

Ni, et al., "The Broadcast Storm Problem in a Mobile Ad Hoc Network," Proceedings of the 5$^{th}$ Annual ACM/IEEE International Conference on Mobile Computing and Networking, ACM, 1999, 151-162.

Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.

Niculescu, et al., "Trajectory Based Forwarding and Its Applications," Proc. Mobicom 2003, ACM, 2003, 13 pages.

Ns-2, "The Network Simulator," 2010, http://isi.edu.

Schwingenschlogl, "Geocast Enhancements of AODV for Vehicular Networks," ACM Sigmobile Mobile Computing and Communications Review, Jun. 2002, 18 pages.

Shevade, et al., "Enabling High-Bandwidth Vehicular Content Distribution," Proceedings of CoNEXT 2010, Nov. 30-Dec. 3, 2010, 12 pages.

Yassein, et al., "Performance Analysis of Adjusted Probabilistic Broadcasting in Mobile Ad Hoc Networks," Proc. 11$^{th}$ Intl. Conf. on Parallel and Distributed Systems Workshops, 2005, 27 pages.

Zahn, et al., "Feasibility of Content Dissemination Between Devices in Moving Vehicles," Proceedings of CoNEXT 2009, Dec. 1-4, 2009, 11 pages.

Zorzi, et al., "Geographic Random Forwarding (GeRaF) for Ad Hoc and Sensor Networks: Multihop Peformance," IEEE Transactions on Mobile Computing, Dec. 2003, 11 pages.

Social + Gaming – SWiK: http://swik.net/social+ gaming.

http://askville.amazon.com/Wii-games-play-Internet-Family/AnswerViewer.do?requestId=6796582(2007).

Schutzberg, "Phone-based GPS-based Games: Missing Pieces"; http://www.directionsmag.com/articlephp?article_id=939 (Aug. 17, 2005).

"Boost Mobile Introduces First Location-based, GPS games in US" http://www.physorg.com/news5824.html (Aug. 16, 2005).

"*Sony bigwig hints at GPS-enabled PSP games*"; http:www.vespacious.com/sony-bigwig-hints-at-gps-enabled-psp-games.html (Dec. 22, 2008).

*Steve:"GPS-enabled Cell Phone Games*" http://www.strangenewproducts.com/2005/08/gps-enabled-cell-phone-games.html (Aug. 15, 2005.

*Location-Enable Mobile Gaming*; http://www.nn4d.com/site/global/market/affiliate_sites/lbsglobe/lbsapplications/mobilegaming.jsp (2007).

U.S. Appl. No. 13/327,427, filed Dec. 15, 2011, Hall.

U.S. Appl. No. 13/333,084, filed Dec. 21, 2011, Hall.

SYSTEM AND METHOD FOR MOBILE AD HOC NETWORK

RELATED APPLICATION

This application is a continuation of U.S. patent application Ser. No. 11/289,899, entitled "System and Method for Mobile Ad Hoc Network," filed on Nov. 30, 2005, and is related to application Ser. No. 11/289,898, entitled "System and Method for Mobile Ad Hoc Network", filed on Nov. 30, 2005, both of which are incorporated herein by reference.

BACKGROUND OF THE INVENTION

The present invention is directed to mobile ad hoc networks (MANETs). More specifically, the present invention is directed to a system and method for multicasting data packets in a MANET.

A MANET is basically a network of mobile wireless terminals, such as wireless phones, that communicate with each other within a given region or area. A MANET does not require or use "base station" terminals to control the communications between the wireless terminals. Each wireless terminal is capable of receiving/transmitting data packets to/from other wireless terminals in the MANET.

In a MANET, when a wireless terminal intends to send the same information to more than one destination (i.e. more than one wireless terminal recipient), it will typically broadcast (i.e. transmit the information so that any terminal within range can receive it) or multicast (i.e. a series of broadcasts from terminal to terminal through the network) the information instead of transmitting a series of unicasts (a separate transmission to each intended recipient). In a traditional broadcast, the broadcasting wireless terminal will simply transmit the information once and hope that all the intended recipients are in range to receive the transmission. The intended recipients that are outside the range of the broadcasting terminal, however, will not be able to receive the message. Another technique such as multicasting would have to be used to get the message to such remote terminals.

In a conventional multicast, the intended recipients register to a predetermined group address. The originating (sending) wireless terminal will address the message to the group address and transmit the message once. The message will then be passed or retransmitted from wireless terminal to wireless terminal (multicast) throughout the MANET so that all the group members have a chance of receiving the multicast message no matter where they are located. Multicasting has been found to be a much more effective technique than broadcasting when intended recipients are located outside the range of the originating wireless terminal.

Although multicasting, and in some cases broadcasting, are effective when the intended recipients are scattered throughout the MANET, they are not efficient for applications where the intended recipients are all located in a defined physical area. For example, when trying to send messages to everyone in a disaster area or all troops in a given baffle venue, multicasting can result in utilizing the processing power of the MANET for many unnecessary transmissions. That is, multicasting may result in multiple retransmission or rebroadcasts by wireless terminals that are not the intended recipients and by wireless terminals that are located in areas remote from the disaster area or the battle venue. Moreover, due to the fact that mobile terminals move often and unpredictably, it is impractical to maintain a (registered) multicast group for each arbitrary geographic region. As a result, for such applications, a technique called geographical broadcasting, or geocasting, is preferred.

The basic idea of a geocast is to send a packet to every node geographically positioned within a specified region called a geocast region. The set of wireless terminals in the geocast region are referred to as the geocast group. If a wireless terminal resides in the geocast region it will automatically become a member of the corresponding geocast group, and thus no registration is necessary (as in conventional multicasting). A wireless terminal may therefore send a message to every wireless terminal in the geocast group by simply addressing the message to the geocast region.

One approach that has been proposed for geocasting in a MANET is a technique called location-based flooding. Geocasting through location-based flooding requires that the wireless terminals in the MANET are equipped with the ability to determine their own location using, for example, a Global Positioning System (GPS), and are able to determine the coordinates that define the geocast region (typically from a geographic "address" within the data packet itself). The wireless terminal initiating or originating the communication will address the packets to include its own location coordinates and a description of the geocast region, and then broadcast the packets to its neighboring wireless terminals. Each neighboring wireless terminal will then compare the geocast region coordinates to its own location. If its location is within the specified geocast region, it will accept the packet, process it, and may also decide to rebroadcast, or retransmit, the packet to its neighboring wireless terminals. If its location is outside the geocast region, it will not process the packet but it may decide to retransmit the packet in order to further propagate it to wireless terminals that may not as yet have received the packet. If the wireless terminal decides to retransmit, it will replace the location information of the originating terminal in the packet with its own location information. This process will be repeated as the packet is retransmitted through the MANET.

In such present-day systems, the decision whether to retransmit is typically made based upon a location-based flooding decision algorithm which may take into account from how far away the received packet was transmitted. To do this, the wireless terminal that receives the packet will compare its present geographical location to the geographical location of the sending wireless terminal (obtained from the location information in the packet). Packets that have been received from sending terminals that are located no closer than some minimum distance away are retransmitted. All other packets may be dropped.

Although such present-day location-based flooding algorithms are simple and robust, they are not efficient for geographically large MANETs. In geographically large MANETs, such algorithms may result in the packets traveling paths having many "hops" and therefore taking a long time to be transmitted from source to destination. In addition, when the MANET includes a large number of wireless terminals in an extended area, such algorithms tend to result in many unnecessary retransmissions, wasting the resources of the MANET.

BRIEF SUMMARY OF THE INVENTION

The present invention provides a more efficient method for location-based flooding geocast packets in a MANET. This is accomplished by limiting a wireless terminal's ability to retransmit a geocast packet on the MANET based on the number of times the packet was previously received, its proximity with respect to the wireless terminals from which the packet was sent, and/or its proximity to the geocast region. The result is a location-based flooding approach that reduces the number of redundant or wasted retransmissions on the MANET over the prior art.

In one embodiment of the invention, the decision as to whether to retransmit a received geocast packet on the MANET is a three step process. First, the receiving terminal determines whether it has previously received the same packet at least M times. If not, it retransmits the packet on the MANET. If so, it moves to the second step and determines whether the sending terminal is closer than some minimum distance away. If no prior transmitter of the packet was closer than some minimum distance away, the wireless terminal retransmits the packet on the MANET. Otherwise, it moves to the third step and determines whether it is closer to the center of the geocast region than any sending terminal from which the packet was received. If so, it transmits the packet on the MANET. If not, it will not retransmit the packet.

Such a location-based flooding process prevents the receiving wireless terminal from retransmitting a packet that was most likely already retransmitted by another wireless terminal located close to it (and thus most likely reaching the same neighboring terminals that it can reach. In addition, such a location-based flooding process reduces the chance that the wireless terminal will retransmit the same packet multiple times to the same neighboring terminals. As a result, the location-based flooding process in accordance with the present invention reduces the number of wasted or redundant retransmissions on the MANET. Complementarily, the minimum-number-of-transmissions check adds some level of redundancy to compensate for the fact that any one transmission can fail to reach certain receivers.

These and other advantages of the invention will be apparent to those of ordinary skill in the art by reference to the following detailed description and the accompanying drawings.

DETAILED DESCRIPTION

Figure 1:
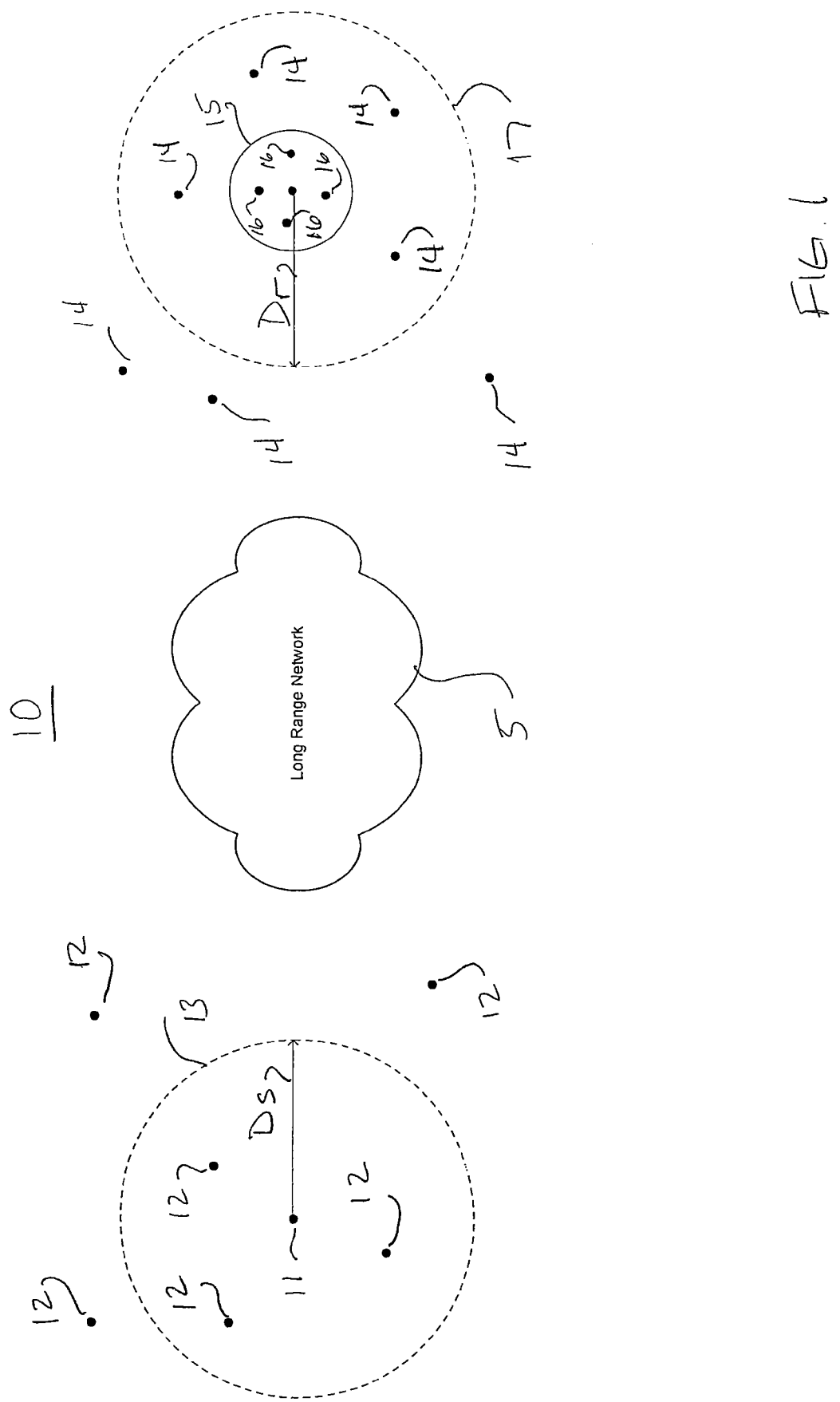
FIG. 1 illustrates a network in which an embodiment of a location-based flood may be used in accordance with the present invention.

FIG. 1 shows a network 10 in accordance with an embodiment of the present invention. As shown, network 10 includes a plurality of wireless terminals 11, 12, 14 and 16 that form a MANET. Each wireless terminal 11, 12, 14 and 16 is operable to determine its own geographical location through any type of location determination system including, for example, the Global Positioning System. Each wireless terminal is operable to transmit and receive packets on the MANET. In addition, at any given time, some subset (possibly all) of the wireless terminals may be operable to transmit and receive packets over a long-range network 5. The long-rang network 5 can be any network in which packets can be transmitted from one long-range capable wireless terminal to another long-range capable wireless terminal. Many such packet networks are well known in the art including, for example, an infrastructure-based network comprising wireless base stations (for up- and down-link) operating on a separate frequency from that used by the MANET transmissions and connected together by a wired network using switches and fiber optic links, and need not be described in detail herein. In addition, the long-rang network 5 could also be implemented simply as another instance of a MANET using distinct radio frequencies and longer radio ranges.

Network 10 has an origination region 13 that covers a circular geographical area with a diameter Ds around wireless terminal 11 as the center point. Network 10 also has a termination region 17 that covers a circular geographical area with a diameter Dr around the center of the geocast region 15 as the center point. Of course, those skilled in the art can recognize that origination and termination regions 13 and 17 can be defined in terms of other geometric shapes such as rectangles, hexagons, irregular shapes, curvilinear shapes, or in any desired mixture of such shapes. Moreover, the information that defines these regions, e.g. the location, size and shape, can be carried in the packets themselves. The information may therefore vary from packet to packet or it can be fixed in advance of communications (and in such an embodiment need not be carried in each packet).

In network 10, as shown, originating wireless terminal 11 and some of its neighboring wireless terminals 12 are located within the origination region 13. Some of the wireless terminals 14 and all of the wireless terminals 16 (which are located in the geocast region) are located within the termination region 17.

In network 10, when originating wireless terminal 11 wants to geocast a packet to wireless terminals 16 located in geocast region 15, it will address the packet with its own location coordinates (as the sending location) and the location coordinates of the geocast region. If the originating wireless terminal is not long range capable at the time it wishes to transmit, it will then initiate a location-based flooding of the packet to all neighboring wireless terminals 12 on the MANET. A wireless terminal 12 that is long-range capable at the time of receiving the packet (whether in the origination region 13 or not) will retransmit the packet on the long-rang network 5 to all long range capable terminals 14 or 16 lying within the termination region. The long-range transfer can be achieved by multicast or by any other means known in the art. Of course, it can be appreciated that other techniques may be used, such as broadcast, a series of unicasts, geocasts, or other techniques for notifying a set of recipients of a single transmission. In a particular embodiment, if a plurality of wireless terminals 12 receive the packet, only the first wireless terminal 12 to receive the packet will retransmit the packet on the long-range network 5; the others will avoid retransmitting on the long-rang network 5 if they determine that the same packet has already been thus transmitted. Each long range capable wireless terminal 14 or 16 will receive the packet and compare its own location to the location of the geocast region 15. If the location of the receiving wireless terminal 14 or 16 is within a distance Dr of the geocast region 15, hence lying within the termination region 17, it may choose to transmit the packet on the MANET, initiating or continuing the simple location-based flooding of the termination region. The decision of whether to transmit as part of the location-based flooding may be made based upon a location-based flooding decision algorithm in accordance with the present invention such as the one described below and shown in FIG. 3. If a wireless terminal 14 that is not located within the termination region (and not within the origination region) receives the packet, it will not retransmit the packet on the MANET.

If, on the other hand, the originating wireless terminal 11 is itself long range capable at the time it wishes to send and not already lying in the termination region (as shown in FIG. 1, for example), it will transmit the packet on the long-rang network 5 to all long range capable terminals 14 or 16 lying within the termination region. In this case, the originating terminal 11 does not also transmit the packet on the MANET, as this would be unnecessary in the origination region, the goal of getting the packet onto the long-rang network 5 having already been achieved.

Packets transmitted over the long-rang network 5 from the wireless terminals 12 will be received over the long-rang network 5 by wireless terminals 14 and 16. The wireless terminals 14 that are located outside the distance Dr from the geocast region 15, and thus outside the termination region 17, will not retransmit the packet on the MANET. The wireless terminals 14 that are located within the termination region 17 and the wireless terminals located within the geocast region 15 will participate in location-based flooding of the termination region and hence may decide to retransmit the packet on the MANET.

In network 10, it should therefore be understood that the retransmission of packets is limited depending on the long range capability of the wireless terminal, and the proximity of the wireless terminal to the origination wireless terminal 11 and the geocast region 15. The size and shape of the origination region and the termination region can be any size and shape desired by those skilled in the art. It can be appreciated by those skilled in the art, however, that by increasing the distance Dr or the size of the termination region 17, the number of rebroadcasts on the MANET will thereby tend to increase. By decreasing the size of the termination region 17 or the distance Dr, the amount of rebroadcasts on the MANET may decrease. Similarly, it can be appreciated by those skilled in the art that by increasing the size of the origination region 13 or the distance Ds, the number of rebroadcasts on the long-rang network 5 will tend to increase. By decreasing the size of the origination region 13 or the distance Ds, the amount of rebroadcasts on the long-rang network 5 may decrease. However, it is also clear that decreasing either the origination region 13 or the termination region 17, or both, may result in the packet failing to reach the geocast region, as it may occur that no wireless terminal within the smaller origination or termination region is long range capable at the time the packet is to be transmitted. As a result, the appropriate choice of Ds and Dr, or the size of the origination region 13 and termination region 17, can be made when judging the typical geographic distributions of nodes and the required reliability of communications as determined by each particular application of the present invention.

Figure 3:
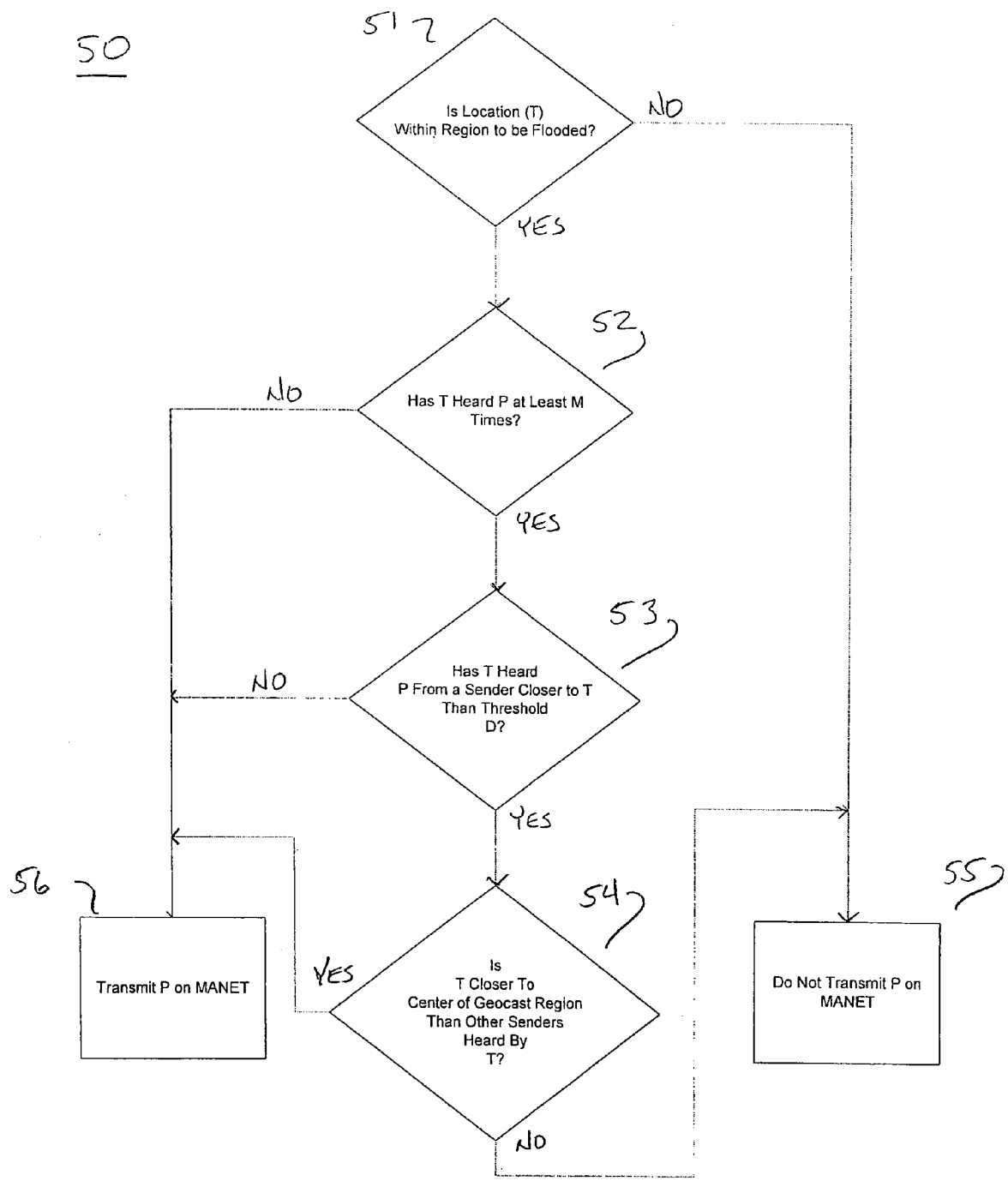
FIG. 3 illustrates a method for location-based flooding in accordance with an embodiment of the present invention.

Referring to FIG. 3, there is shown a method 50 for location-based flooding in accordance with the present invention. As shown, method 50 begins with step 51 where a wireless terminal T upon receiving a geocast packet determines whether it is located within a termination region that covers a geographical area including the geocast region. The termination region may be a region of any desired shape and size such as a circle having a given radius but should be geographically located such that the area that it covers includes the geocast region. The wireless terminal T may determine whether it is located in the termination region by any desired means including, for example, using a Global Positioning System to determine its geographical location, and using location information in the geocast packet to determine the location, size, and shape of the geocast region and thus the termination region. The wireless terminal T may then compare its geographical location to the location information of the termination region.

If the wireless terminal T is not located within the termination region then it will proceed to step 55 wherein it will not retransmit the received geocast packet on the MANET. If the wireless terminal T is located within the termination region then, at step 52, it will determine whether it received the same geocast packet at least some minimum number of times M. If the geocast packet was not already received at least some minimum number of times M then, at step 56, the wireless terminal T will retransmit the packet on the MANET. If the packet already was received some minimum number of times M then, at step 53, the wireless terminal T will determine whether it has received the geocast packet from a sending wireless terminal that is closer to wireless terminal T than some minimum distance D. The wireless terminal T may make this determination by comparing its present geographical location (e.g. determined using a global positioning system) to the location of the sending wireless terminal that transmitted the geocast packet. The location of the sending wireless terminal may be determined using location information in the geocast packet. As is known in the art, location information of the sender of a packet is including in geocast packets. Such location information is typically in the form of geographical coordinates. Such geographical coordinates of the sending wireless terminal may therefore be compared by wireless terminal T to its own geographical coordinates to make the determination of step 53.

If the sending wireless terminal is determined to not be located within the minimum distance D then, at step 56, wireless terminal T will transmit the packet on the MANET. If the sending wireless terminal is determined to be located within the minimum distance D then, at step 54, wireless terminal T will determine whether it is located closer to the center of the geocast region than any sending terminal from which the same packet was received by wireless terminal T. Wireless terminal T may make this determination by comparing its geographical location to the location coordinates of the sending terminal found in each of the packets it received (as described above).

If wireless terminal T is determined to be closer to the center of the geocast region than any other sending terminal from which it received the same packet then, at step 56, wireless terminal T will transmit the packet on the MANET. If any of the sending wireless terminals are closer than wireless terminal T then, at step 55, wireless terminal T will not transmit the packet on the MANET.

By limiting retransmissions on the MANET to wireless terminals that have not previously received the same packet some minimum number of times (see step 52), method 50 reduces the number of repeated retransmissions of the same packet on the MANET over prior art systems. In addition, by limiting retransmissions of a given packet on the MANET to wireless terminals that are closest to the center of the geocast region (see step 54), method 50 further reduces the number of retransmissions of the same packet on the MANET over the prior art. This preference of transmissions near the center of the geocast region can also improve coverage (likelihood of packet reaching all nodes in the geocast region) in some applications.

Figure 4:
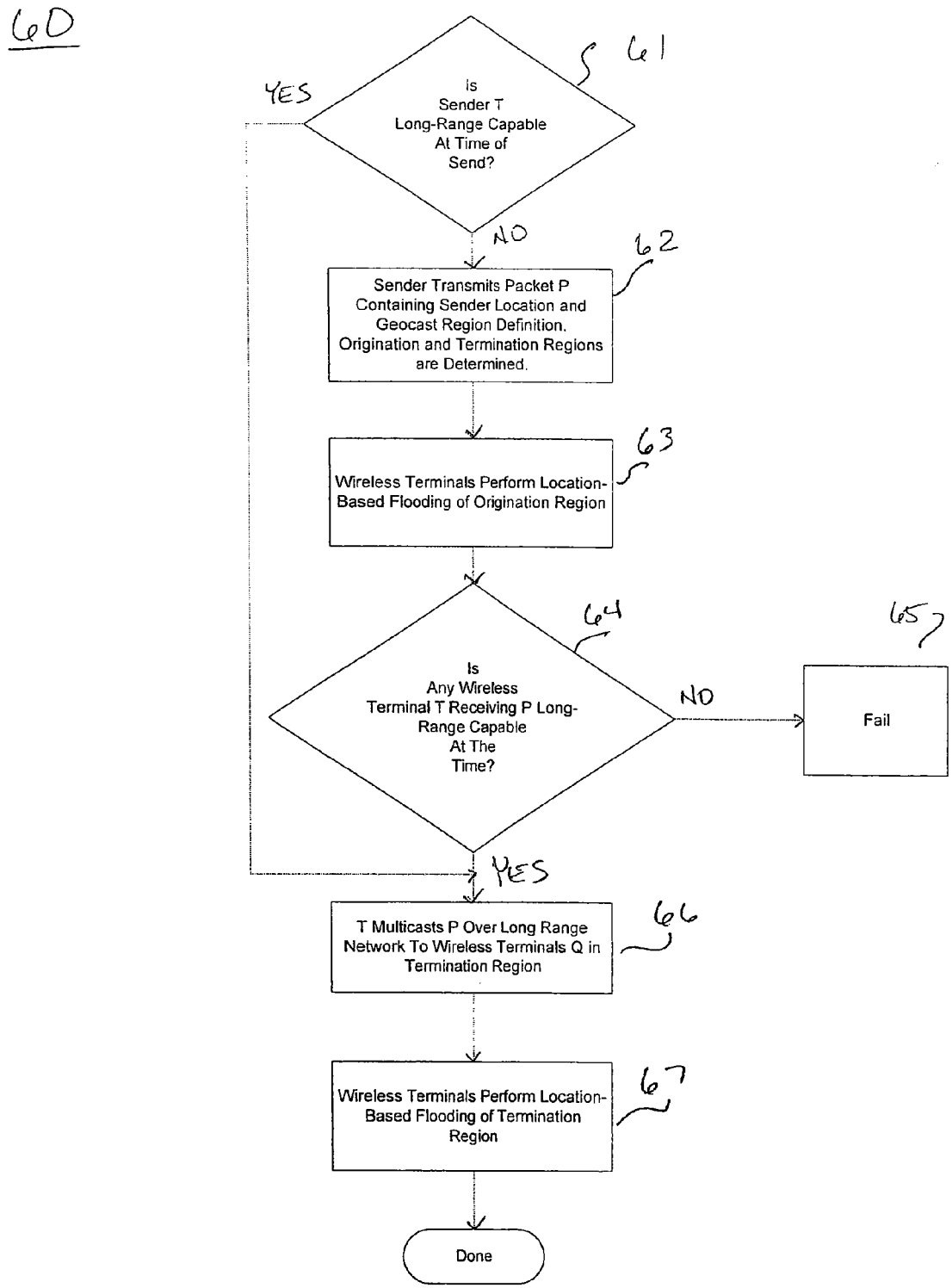
FIG. 4 illustrates a method for geocasting using a long-range network in accordance with an embodiment of the present invention.

Referring now to FIG. 4, there is shown a method 60 for use by a wireless terminal to decide whether to retransmit a geocast packet over the long-range network. As shown, method 60 begins at step 61 wherein a wireless terminal T that originally intends to transmit a geocast packet P to a geocast region first determines whether it is capable of transmitting the packet P over a long-range network. If so, then at step 66 originating wireless terminal T will multicast the packet over the long-range network to wireless terminals Q located in a termination region that includes the geocast region. If not, then at step 62 the originating wireless terminal T will transmit the packet P on the MANET. The packet will contain information including the location of the originating terminal T and a definition of the geocast region. Information in the definition of the geocast region is well known and includes information that enables wireless terminals to determine location information of the geocast region including, for example, location coordinates that define the location, size, and shape of the geocast region.

Also at step 62, the wireless terminals that receive the transmission over the MANET from the originating wireless terminal will determine location information of an origination region and a termination region. The determination of the origination region and the termination region may be made in any way desired by those skilled in the art. For example, the origination region may be fixed a priori by common agreement (e.g. all terminals will use a circular area having a radius X around the originating terminal and a radius Y around the center of the geocast region). Or, as another example, the origination region and the termination region may be specified by the origination terminal in the packet as part of the addressing information.

At step 63, the wireless terminals that received that geocast packet from the originating wireless terminal T on the MANET will then perform location-based flooding of the MANET. Such location-based algorithms are known in the art. In conducting the location-based flooding, at step 64, each wireless terminal will determine whether it is long-range capable (i.e. whether it is operable to transmit the packet on the long-range network) at the time it intends to retransmit the packet. If no terminals are long-range capable, then the geocast will fail at step 65. For any terminal that is long-range capable, it will multicast the packet over the long-range network to wireless terminals Q located in the termination region at step 66. Then, at step 67, the wireless terminals Q in the termination region will perform location-based flooding of the termination region.

By offloading retransmissions of geocast packets from the MANET to the long-range network, method 50 reduces the amount of MANET processing power utilized for each geocast over the prior art. For example, method 50 makes it possible that for each geocast not every reachable wireless terminal in the MANET will have to rebroadcast. Instead, only a subset of the wireless terminals located within the origination region and a subset of the wireless terminals located within the termination region will retransmit the packet, thereby reducing the amount of processing power and wireless bandwidth used for each geocast. In addition, by using the long-range network, many-hop paths on the MANET can be replaced by fewer-hop paths taken via long-range network transmissions, thereby reducing packet latency for paths covering long geographic distances.

Figure 2:
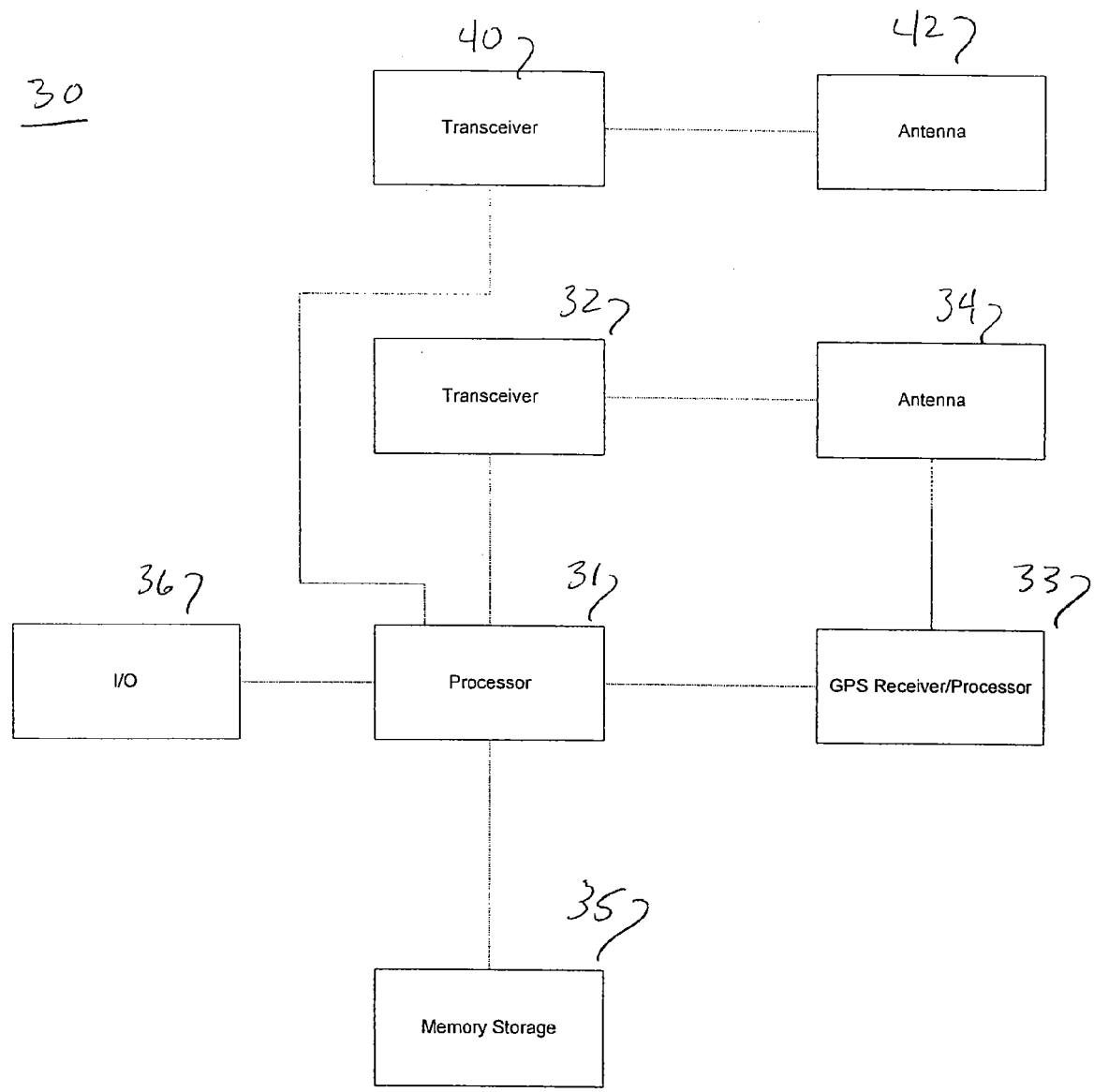
FIG. 2 shows a wireless terminal for performing an embodiment of a location-based flood in accordance with the present invention.

It should be understood that a wireless terminal in accordance with the present invention may be any wireless device operable to execute a communications application to perform the above described functions. Such wireless terminals executing a communications application are well known in the art, and may be implemented, for example, using well known processors, transceivers, memory units, storage devices, computer software, and other components. A high level block diagram of such a wireless terminal 30 is shown in FIG. 2. As shown, wireless terminal 30 contains a processor 31 which controls the overall operation of wireless terminal 30 by executing computer program instruction which define the communications application. The computer program instructions may be hard coded in processor 31 or loaded from an erasable programmable read only memory device (not shown) or other non-volatile memory device as are known in the art when execution of the computer program instructions is desired. Thus, the communications application will be defined by computer program instructions stored in processor 31 and/or erasable programmable read only memory (not shown) and the communications application will be controlled by processor 31 executing the computer program instructions. Wireless terminal 30 includes a memory storage device 35 in which information including geographic location information described above can be stored. Wireless terminal 30 also include a transceiver 32 coupled to an antenna 34 through which data is received and/or transmitted in a MANET. Wireless terminal 30 also includes a transceiver 40 coupled to a long-range antenna 42 through which data is received and/or transmitted in a long-range network. As is understood by those skilled in the art, an alternative embodiment could use a single antenna and transceiver for both purposes as long as the transceiver were capable of operating on both the MANET and the long range network. Radios with tunable parameters governing range, frequency, and even waveform are well known in the art. Wireless terminal 30 also includes a GPS receiver/processor 33 that controls the execution of the geographical locating function of wireless terminal 30. Through GPS receiver/processor 33, wireless terminal 30 can use the global positioning system to determine its own location. Wireless terminal 30 also includes input/output 36 which represents devices (e.g., display, keypad, speakers, buttons, etc.) that allow for user interaction with wireless terminal 30. One skilled in the art will recognize that an implementation of an actual wireless terminal will contain other components as well, and that FIG. 2 is a high level representation of some of the components of such a wireless terminal for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A wireless terminal comprising:
 a receiving means for receiving a geocast packet transmitted from a sending terminal;
 a counting means for determining whether the received geocast packet was previously received at least a number of times;
 a terminal proximity means for determining the proximity of the wireless terminal to the sending terminal;
 a geocast-region proximity means for determining the proximity of the wireless terminal to a geocast region; and
 a retransmission means for selectively retransmitting the received geocast packet on a MANET, the means for selectively retransmitting configured to retransmit the geocast packet based on the determination of the counting means, retransmit the geocast packet based on the determination of the terminal proximity means, if the packet has not been retransmitted based on the determination of the counting means, and retransmit the geocast packet based on the determination of the geocast-region proximity means, if the packet has not been retransmitted based on the determination of the terminal proximity means.

2. The wireless terminal of claim 1 wherein said means for receiving
comprises:
means for receiving the geocast packet on a MANET; and
means for receiving the geocast packet on a long-range network.

3. The wireless terminal of claim 1 wherein said counting means comprises a means for determining whether the geocast packet has been received at least a predetermined number of times.

4. The wireless terminal of claim 1 wherein said terminal proximity means
comprises means for determining whether the sending terminal is located less than some predetermined minimum distance away from said wireless terminal.

5. The wireless terminal of claim 1 wherein said geocast-region proximity
means comprises means for determining whether the wireless terminal is closer to the center of the geocast region than any terminal from which the geocast packet was previously received.

6. A network comprising:
a MANET formed by a plurality of wireless terminals, at least one wireless terminal being operable to:
receive geocast packets transmitted on said MANET from other wireless terminals located in said MANET,
determine whether the received geocast packet was previously received at least a number of times,
determine the proximity of the wireless terminal to the sending terminal, determine the proximity of the wireless terminal to a geocast region, retransmit the geocast packet if the geocast packet was not previously received at least a number of times,
retransmit the geocast packet based on the proximity of the wireless terminal to the sending terminal, if it is determined not to retransmit the geocast packet based on the number of times the geocast packet was received, and
retransmit the geocast packet based on the proximity of the wireless terminal to the sending terminal, if it is determined not to retransmit the geocast packet based on the proximity of the wireless terminal to the geocast region.

7. The network of claim 6 further comprising a long-range network, said at
least one wireless terminal being further configured to receive geocast packets transmitted on said long-range network from other wireless terminals operable to communicate on said long-range network.

8. The wireless terminal of claim 6 wherein the at least one wireless
terminal is further configured to determine whether the geocast packet has been received at least a predetermined minimum distance away from the wireless terminal.

9. The wireless terminal of claim 6 wherein the at least one wireless
terminal is further configured to determine whether the sending terminal is located less than some predetermined minimum distance away from the wireless terminal.

10. The wireless terminal of claim 6 wherein the at least one wireless
terminal is further configured to determine whether the wireless terminal is closer to the center of the geocast region than any terminal from which the geocast packet was previously received.

* * * * *